No. 855,225. PATENTED MAY 28, 1907.
F. H. BROWN, J. E. HANRAHAN & G. A. BOYDEN.
MOLD FOR TYPE CASTING MACHINES.
APPLICATION FILED MAY 18, 1905.
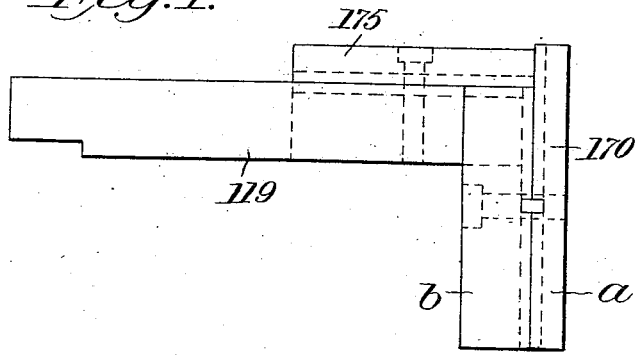
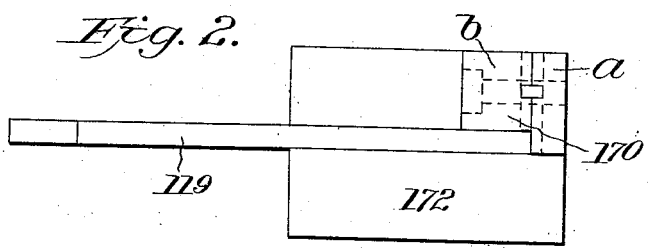
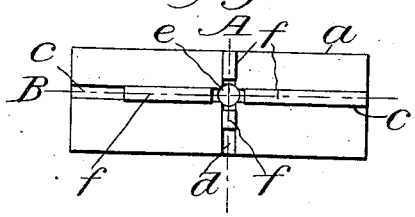
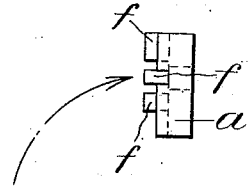
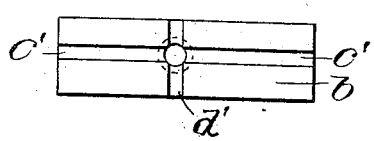
WITNESSES:
C. H. Walker
J. T. Walker.
INVENTORS
Frank H. Brown,
John E. Hanrahan,
George A. Boyden.
BY Wm. S. Hodges
Attorney
THE NORRIS PETERS CO., WASHINGTON, D. C.

UNITED STATES PATENT OFFICE.

FRANK H. BROWN AND JOHN E. HANRAHAN, OF BALTIMORE, AND GEORGE A. BOYDEN, OF MOUNT WASHINGTON, MARYLAND, ASSIGNORS TO NATIONAL COMPOSITYPE COMPANY, OF BALTIMORE, MARYLAND, A CORPORATION OF DELAWARE.

MOLD FOR TYPE-CASTING MACHINES.

No. 855,225.          Specification of Letters Patent.          Patented May 28, 1907.

Application filed May 18, 1905. Serial No. 261,039.

*To all whom it may concern:*

Be it known that we, FRANK H. BROWN and JOHN E. HANRAHAN, of Baltimore, in the State of Maryland, and GEORGE A. BOYDEN, of Mount Washington, in the county of Baltimore and State of Maryland, have invented certain new and useful Improvements in Molds for Type-Casting Machines; and we do hereby declare the following to be a full, clear, and exact description of the invention, such as will enable others skilled in the art to which it appertains to make and use the same.

This invention pertains to molds for type casting and has for its object the holding of parts together in a permanent position relative to each other, at the same time permitting the parts to expand and contract as required by varying temperatures of heat they are subjected to.

The invention will be hereinafter fully set forth and particularly pointed out in the claims.

In the accompanying drawing:—Figure 1 is a top view of the stationary mold part and insert mold. Fig. 2 is a side view of Fig. 1. Fig. 3 is a view of the insert mold member with section removed, showing keys, key-ways and screw holes. Fig. 4 is an end view of Fig. 3. Fig. 5 is a view of part of the insert mold member which is counter to and fits that part of the insert mold shown in Fig. 3. Fig. 6 is an end view of Fig. 5. and adjoining the part shown in Fig. 4 when turned and placed in position as shown by curved dotted lines.

Heretofore sections forming a mold have been held together by means of numerous screws and dowel pins in attempts to rigidly secure them together sufficiently to overcome the expansion and contraction of the parts. However, this only partially accomplished the object as there was endless trouble caused by the parts shifting on each other because they could not be permanently and relatively held to each other, no matter how many screws or dowels were used, as when the parts became heated, and expansion took place the screws and dowels would be strained Then, when the same parts cooled and contraction set in there would be a loosening between the parts, dowels and screws. This would take place to a greater or less extent every time molds so constructed were heated and cooled, resulting in a great deal of trouble and adjustment of the parts. In fact, by methods heretofore used, it was impossible to secure the parts rigidly and permanently together without more or less refitting and adjusting. In order to overcome the above, means are employed herein to permit the parts to expand and contract freely as the conditions require, at the same time keeping them relatively in the same position to each other.

In Figs. 1 and 2, the insert mold member 170, in this instance, is shown in two pieces, $a$ and $b$, and is placed in the position it occupies with the stationary mold member, consisting of base block 172 and plate 175, secured together in the manner hereafter described pertaining to the insert mold member. The ejector 119 is also shown in these views with all the parts in the position they occupy in casting type.

In Fig. 3 the plate or section $a$ of insert mold member 170 is shown separated from section $b$, with the surface exposed, which is contiguous to the section $b$ when the parts are together. In this surface is formed two key-ways $c$ and $d$, also a hole $e$ for a single screw to hold the parts together when assembled. In these key-ways are placed suitable keys $f, f, f, f$, of such length as required by the construction of the mold. These key-ways $c$ and $d$ are at right angles to each other, and form what are technically known as the "dividing" lines A and B. The section $b$ shown in Fig. 5, also has key-ways $c'$ and $d'$ similar to those shown in Fig. 3, and also a screw hole all of which are counter to those in the part $a$. When these two sections are placed together (by turning section $b$ over as shown by dotted lines, Figs. 4 and 5) the keys $f, f, f, f$ fit grooves $c$ and $d$ in both sections. A screw is then inserted which draws them closely together and unites the two in such manner that the two sections are held with their contiguous faces together. However, the body hole of the screw in part $b$ is sufficiently large not to bind the screw, and the screw does not guide or keep the two sections in their relative position to each other at right angles to the axis of the screw, as this is solely done by the keys $f, f, f, f$ in the keyways. When the sections thus united are heated, expanison of the parts takes place in both directions from the "dividing" line A, and in both directions from the "dividing" line B. Consequently the sections expand in all directions freely when heated and contract as freely when cooled, the movement of the parts taking place on the keys, and as these keys and key-ways are at right angles to each other the sections are always held in a position relative to each other, and are not subjected to any strain that effects their relative positions.

By this construction it has been found in practice that the difficulties heretofore experienced are wholly overcome, and after the mold members are once placed in position they never require any readjustment. Therefore no skilled labor is necessary to keep the parts in their proper positions. This is exceptionally valuable wherein hundreds of interchangeable molds parts are made and sent all over the country to be used in conjunction with one stationary mold member attached to the casting machine, and by which printers are enabled to make any size or style of type without skilled labor to manipulate the mold members to overcome the shifting of the same due to expansion and contraction.

It is obvious that this invention can be applied in many ways and to various forms of molds, and the drawings herein are only for illustrative purposes and are not to limit or confine the invention in any particular whatever, as any means that permit the contiguous parts to expand and contract without altering their relative positions one to the other are equivalent and are within these claims.

Having described our invention, what we claim and desire to secure under United States Letters Patent is:—

1. A mold member comprising a plurality of sections, and means interposed between the meeting faces of said sections which will permit the latter to expand and contract and keep them in their positions relative to each other.

2. In molds for type casting, the combination of two or more mold sections provided with keys and key-ways so located that the mold sections can expand or contract and be retained in their relative position.

3. A mold member comprising a plurality of sections the meeting faces of which are provided with a plurality of angularly arranged keys and key ways, whereby said sections are retained in their relative positions under expansion and contraction.

4. A mold member comprising a plurality of sections the meeting faces of which are provided with centrally located keys and key ways arranged at right angles to each other, whereby said sections are retained in their relative positions under expansion and contraction.

In testimony whereof, we have signed this specification in the presence of two subscribing witnesses.

FRANK H. BROWN.
JOHN E. HANRAHAN.
GEORGE A. BOYDEN.

Witnesses:
ELDRIDGE E. HENDERSON,
C. WALTER GWINN.